United States Patent
Apacible et al.

(10) Patent No.: US 6,795,888 B1
(45) Date of Patent: *Sep. 21, 2004

(54) INSTALLABLE LOGGING MODULES IN NETWORK SERVERS

(75) Inventors: Johnson R. Apacible, Redmond, WA (US); Kim Stebbens, Redmond, WA (US); Terence Kwan, Mountain View, CA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 910 days.

(21) Appl. No.: 08/980,585

(22) Filed: Dec. 1, 1997

(51) Int. Cl.[7] .................. G06F 12/00; G06F 15/173
(52) U.S. Cl. .................. 711/1; 711/126; 711/170; 709/223
(58) Field of Search .................. 706/6; 709/220, 709/223, 217–219, 23, 24; 369/13, 53–58; 707/200, 522; 710/15, 18, 74; 711/4, 1, 123, 126, 170

(56) References Cited

U.S. PATENT DOCUMENTS

| | | | | |
|---|---|---|---|---|
| 5,208,745 A | * | 5/1993 | Quentin et al. | 364/188 |
| 5,499,340 A | * | 3/1996 | Barritz | 395/184.01 |
| 5,684,945 A | * | 11/1997 | Chen et al. | 395/182.18 |
| 5,734,820 A | * | 3/1998 | Howard et al. | 395/186 |
| 5,857,190 A | * | 1/1999 | Brown | 707/10 |
| 5,899,990 A | * | 5/1999 | Maritzen et al. | 707/4 |
| 5,983,270 A | * | 11/1999 | Abraham et al. | 709/224 |
| 5,987,454 A | * | 11/1999 | Hobbs | 707/4 |

OTHER PUBLICATIONS

Ref: A: Newton's Telecom Dictionary, Newton, H., Flatiron Publishing, 14th Expanded and Updated Ed., Mar., 1998. see terms SQL, SQL server, ODBC.*

Ref: B: Newton's Telecom Dictionary, Newton, H., Flatiron Publishing, 14th Expanded and Updated Ed., Mar., 1998, see term API.*

Ref A: Computer Dictionary, Redmond, WA, Microsoft Press, 3erd Ed., Sep. 1997, see Server.*

* cited by examiner

*Primary Examiner*—Jack B. Harvey
*Assistant Examiner*—Beatriz Prieto
(74) *Attorney, Agent, or Firm*—Lee & Hayes, PLLC (57) ABSTRACT

The invention includes a system and method for logging network server data such as data relating to client requests. In accordance with the invention, end users of a server program can create one or more logging modules, each having a predefined interface that is defined by the server program. In response to client requests, the server program calls logging modules that have been designated by a system administrator, and passes potential log data to the logging modules. In response to receiving the potential log data, each logging module makes its own decision regarding (a) whether to make a log entry, (b) which data should be included in the log entry, and (c) the format that is used for recording the log data. In this way, end users are not constrained to any given logging format or set of logging criteria.

35 Claims, 3 Drawing Sheets

INSTALLABLE LOGGING MODULES IN NETWORK SERVERS

TECHNICAL FIELD

This invention relates to network servers and to methods of logging client information requests in conjunction with such network servers.

BACKGROUND

Computers are increasingly becoming interconnected at higher and higher levels through networking technologies. The public Internet is currently the most visible manifestation of this trend. Smaller scale networks, however, are also becoming more widespread.

Such networks allow application programs to be structured using client/server architectures. A server or server process is a provider of services. A client or client process is a consumer of services. A server can service many clients at the same time and regulate their access to shared resources. In most cases, interaction between clients and servers is initiated by clients-servers wait is passively for client requests, and provide data, information, or services in response to such requests.

Servers are available to provide a variety of services. There are file servers, database servers, transaction servers, groupware or mail servers, object servers, Internet World Wide Web (WWW or Web) servers, and many other types of servers.

Many servers record a log of client requests and of the way in which the client requests were handled. Log data is typically recorded in one or more files. This is useful for a variety of purposes. One use for a log file is to troubleshoot client/server operation. Log files can be used for capacity planning, for accounting, and for security purposes. Log files are also frequently used to compile statistical data regarding server usage. This is becoming increasingly important for Internet servers, where advertising revenue depends on the number and nature of client requests for specific content.

Log files are typically formatted in accordance with established standards. For example, there is a log file standard known as the NSCA (National Center for Supercomputer Applications) log format.

When designing a server application, it is necessary to decide upon a log file format. It is also necessary to decide which types of client requests will be logged, which data will be logged from such client requests, and where log files will be created. Generally, there is a tradeoff between efficiency and the amount of data that will be logged; increasing the amount of logged data requires more storage space and generally degrades performance of a server application.

It is difficult to predict the needs of server users. Some might require a high degree of data logging, while others need very little logging. In addition, it has been found that different users prefer their logged data in different formats. One way to address these problems would be to modify the server program for each end user of a server application. This would be impractical, however, for programs that are widely distributed. Another solution would be to log every conceivable item of information. However, this would create huge log files, containing items that would rarely be used. A further alternative would be to provide user-selectable options regarding logging criteria. The problem with this scheme is that it is very difficult to provide enough flexibility to meet the needs of every user.

SUMMARY

The inventors have developed a server architecture that allows each end user to log client requests in a different way. In accordance with this architecture, a server program makes calls to one or more logging modules in response to potentially loggable events. The calls are made through a pre-defined interface, and potential log data is passed to the logging modules.

An end user of the server program can select from a plurality of logging modules that are distributed with the server program, or can create custom logging modules. Each logging module, in response to receiving the potential log data, makes its own decision regarding (a) whether to make a log entry, (b) which data should be included in the log entry, (c) the format that is used for recording the log data; and (d) where to record log entries. In this way, end users are not constrained to any given logging format or set of logging criteria. One end user might use a logging module that records data in conventional NSCA format, while another might create a custom logging module that records data in a customized spreadsheet format.

DETAILED DESCRIPTION

Figure 1:
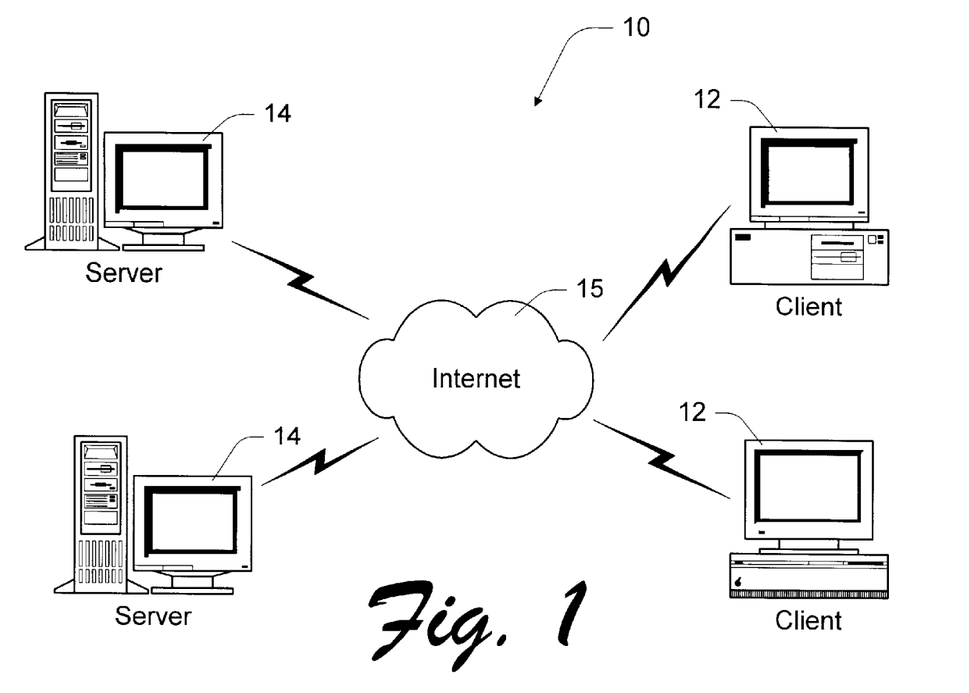
FIG. 1 illustrates a networked client/server system in accordance with the invention.

FIG. 1 shows a client/server network environment in accordance with the invention, generally designated by reference numeral 10. In the embodiment shown, the system is implemented over the public Internet, using the World Wide Web (WWW or Web) and its hyperlinking capabilities. The invention is applicable to other networks as well, such as local area networks, wide area networks, and intranets. The description herein assumes a general knowledge of technologies relating to networking and to the Internet, and specifically of topics relating to client/server architecture and operations.

System 10 includes network clients 12 and one or more network servers 14, all of which are connected for data communications over the Internet 15. In the described embodiment, the clients and servers are implemented as personal computers, workstations, and/or server computers. For example, these components can be implemented as computers of the type that are typically referred to as "IBM-compatible."

Figure 2:
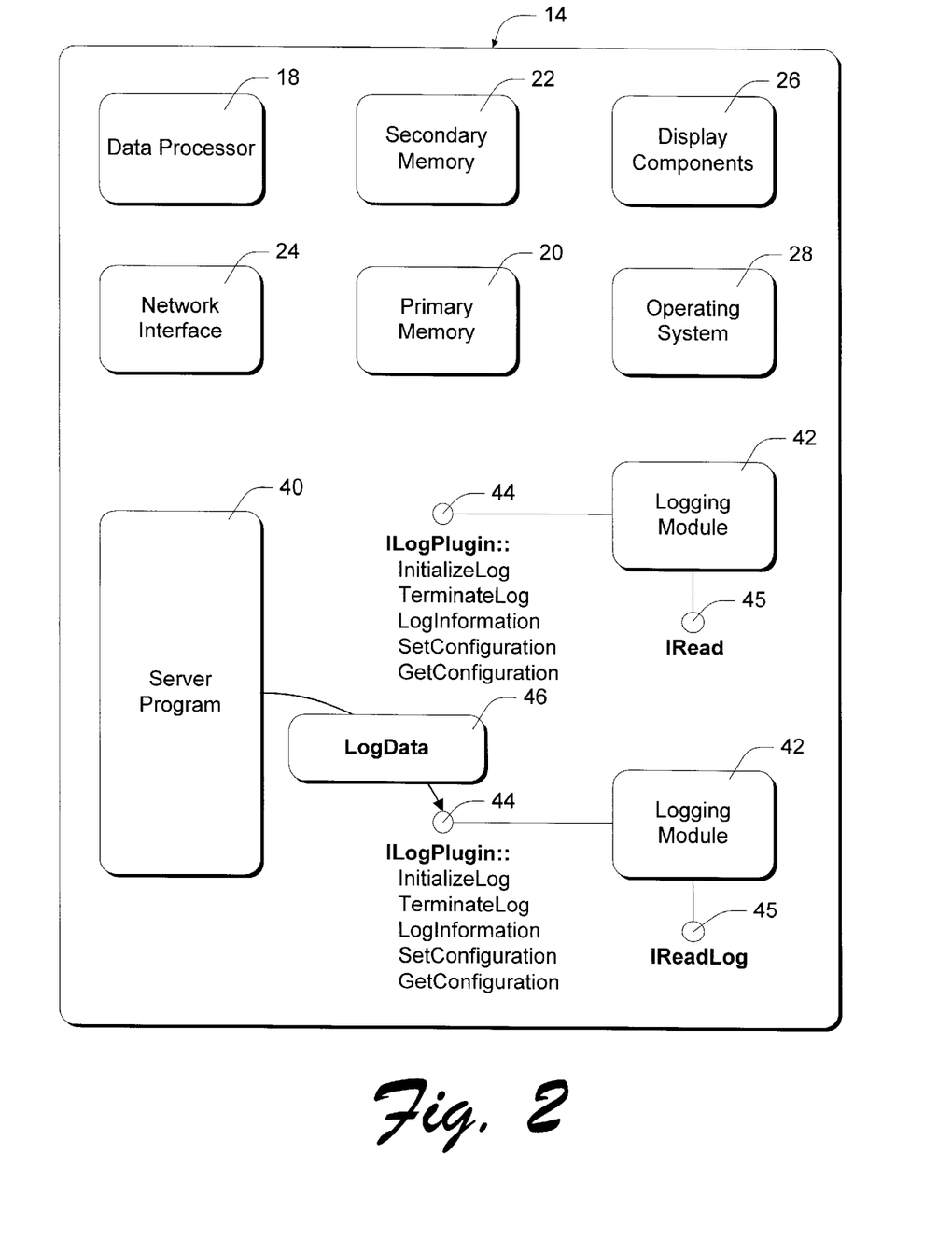
FIG. 2 is a block diagram showing pertinent components of a server computer in accordance with the invention.

An example of a server computer 14 is illustrated in block form in FIG. 2. It includes conventional components such as one or more data processors 18; volatile and non-volatile primary electronic memory 20; secondary memory 22 such as hard disks and floppy disks or other removable media; network interface components 24; display devices, interfaces, and drivers 26; and other components that are well known. Each network server 14 runs an network operating system 28 such as the Windows NT operating system. Network servers 14 and their operating systems are configured in accordance with known technology to communicate with client computers through the Internet or other network media.

The data processors of server computer 14 are programmed by means of instructions stored at different times in the various computer-readable storage media of the computer. Programs are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are shown in FIG. 2 as discrete blocks within a computer, although it is recognized that such programs and components reside at various times in different storage components of the computer, and are executed by the data processor(s) of the computer.

A network server program 40 is stored on the computer-readable storage media of server computer 14, and server computer 14 is configured to execute network server program 40. In the described embodiment of the invention, the server program is an Internet Web server. However, other types of server programs might also employ the techniques described herein. Server program 40 is executable by data processors 18 to receive and process data requests from network clients in accordance with conventional server practice.

Server program 40 is also configured to recognize client requests as potentially loggable events, and to selectively log data relating to such events using criteria and formats that are established by the end user or system administrator of network server 14. To this end, a plurality of logging modules 42 are stored on the computer-readable storage media of computer 14. The logging modules are executable to log data in accordance with different logging criteria, and can be used interchangeably with the network server program. More specifically, an end user or system administrator can create and install one or more logging modules 42 that work in conjunction with server program 40 to log client request data or other loggable events and data. Server program 40 is configurable by the system administrator to automatically provide log data to any one or more of the logging modules that are designated by the system administrator. Each logging module logs client request data in accordance with its own, independent criteria and logging format.

Using this architecture, logging can be implemented in a different way on every different server. One server administrator might install a logging module that records detailed records of client requests, while another user might use a logging module that records only very limited data. The administrator can choose not only which data items are recorded, but can also filter loggable events and record data only from selected events. Furthermore, each logging module can be designed to record log data in a different way. One module might record data in a standard NSCA format, while another logging module might record data in a database or spreadsheet format for analysis using those common tools. Logging modules can also be configured to provide immediate alerts or to take other immediate actions based on event data, immediately after such data is generated.

This flexibility is accomplished by defining a common, identical interface 44, referred to as the ILogPlugin interface, that is exposed by each of the logging modules. This predefined interface has at least one interface method, referred to as the LogInformation method, that is invoked by the network server program in response to any potentially loggable event. In the embodiment described herein, this interface method accepts an object 46, referred to as a LogData object, as an argument. The LogData object includes log data that is accessible through object interface methods. The LogInformation method queries the LogData object using the interface methods of the LogData object to obtain any information relating to client requests that is needed for logging or for making decisions about logging activities.

The logging modules and the LogData object are implemented as COM (component object model) objects in accordance with the OLE (object linking and embedding) standard as is commonly used in Windows programming environments. Refer to Brockschmit, Kraig, "*Inside OLE, Second Edition*," Microsoft Press (Redmond, Wash., 1995), which is hereby incorporated by reference, for a detailed explanation of COM objects. In accordance with COM conventions, each object exposes one or more interfaces (represented in FIG. 2 as small circles attached to objects), and each interface has one or more methods (only the methods of the ILogPlugin interface are enumerated in FIG. 2). A method can be invoked by other program components. COM objects and other components can be created using widely available programming utilities, such as Microsoft C++ or Microsoft Visual Basic.

FIG. 2 shows two logging modules 42, and two interfaces 44 and 45 for each logging module. In the embodiment described herein, the ILogPlugin interface has the following five methods, that perform the listed functions:

| Method | Description |
| --- | --- |
| ILogPlugin::InitializeLog | Initializes the IlogPlugin interface. |
| ILogPlugin::TerminateLog | Closes the ILogPlugin interface. |
| ILogPlugin::LogInformation | Receives potentially loggable log data relating to network client requests, and selectively logs such |

| Method | Description |
| --- | --- |
| | data in accordance with criteria that are defined within the IlogPlugin interface itself. |
| ILogPlugin::SetConfiguration | Sets a current logging configuration. |
| ILogPlugin::GetConfiguration | Returns a current logging configuration. |

The SetConfiguration and GetConfiguration methods allow the server to set configurable parameters in the logging module.

A logging module can implement additional methods within this interface; however, a particular server program in accordance with the invention will define a minimum set of methods, and compatible logging modules will expose at least that minimum set of methods. Thus, any particular implementation of a server program will provide log data through a predefined interface method that is common to any logging module designated by the system administrator for use with that server program.

Each available logging module 42 is registered with server program 40 through a system registry or other similar mechanism. An administrative interface in server program 40 is used to select one or more logging modules from the plurality of available logging modules. Thus, logging modules can be installed, selected, and replaced at any time as needs change. An end user is not limited to an initial or default configuration, or to the particular logging format chosen by the manufacturer of a server program. It is not necessary to modify the server program itself in order to change logging options.

When a particular logging module is selected for use with a server program, the server program calls the LogInformation method of the ILogPlugin interface after every potentially loggable event. More specifically, the server program calls the logging module after every client request. In conjunction with each call, an instance of a LogData object is passed as an argument to the LogInformation method. The LogData object has at least the following methods:

| Method | Description |
| --- | --- |
| LogData::GetBytesRecvd | Returns the number of bytes received from the client. |
| LogData::GetBytesSent | Returns the number of bytes sent by the client. |
| LogData::GetClientHostName | Returns the IP address of the client. |
| LogData::GetClientUserName | Returns the user name of the client. |
| LogData::GetComputerName | Returns the local machine to which the logging module is being applied. |
| LogData::GetExtraHTTPHeaders | Returns a NULL-separated list of parameters requested by the logging module from the Web server. |
| LogData::GetOperation | Retrieves the function to be called. |
| LogData::GetParameters | Retrieves the parameters related to the current operation. |
| LogData::GetPortNumber | Retrieves the number of the port the client is connected to. |
| LogData::GetProtocolStatus | Retrieves the protocol dependent status code returned to the client. |
| LogData::GetServerAddress | Obtains the IP address of the server that is having its activity recorded by the logging module. |
| LogData::GetSiteName | Obtains the name of the server instance which is being logged. |
| LogData::GetTarget | Obtains the target for the current operation. |
| LogData::GetTimeForProcessing | Retrieves the number of milliseconds it took for the operation to complete. |
| LogData::GetWin32Status | Retrieves the Win32 status code of the request. |
| LogData::GetClientHTTPVersion | Retrieves the version of HTTP that the client is using. |

These interface methods are applicable primarily to the described embodiment of an Internet Web server that runs under the Windows NT operating system. Embodiments of other server types will define similar methods corresponding to properties that relate to pertinent client requests and other server transactions.

The ILogPlugin::LogInformation method, when it is called, can take any action deemed appropriate by the designer of the logging module. The logging module has all of the LogData methods at its disposal. It can choose whether to make a log entry based on values returned by the LogData methods. If a decision is made to record a log entry, further LogData methods can be called to retrieve data items to record. The logging module can record data in any desired format, on any specified media, all in accordance with the goals for which the logging module is designed.

The IReadLog interface shown in FIG. 2 is an optional interface used by client programs (not shown) to read logged data when it is not desired to read such data directly from a log file. The IReadLog interface has methods that allow client programs to read individual records of a log. Specifically, the IReadLog methods can be called to return an object that has the LogData methods described above, so that client programs can read individual records using these common methods.

Figure 3:
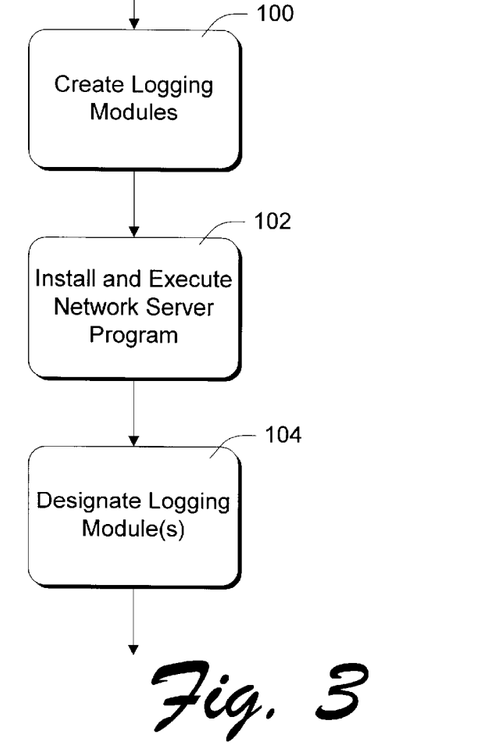
FIGS. 3 and 4 are flow charts illustrating preferred methodological steps in accordance with the invention.

FIG. 3 shows preferred methodological steps performed by a system administrator or by other responsible persons to configure a custom logging setup. A step 100 comprises creating one or more logging modules, each having a common, predefined interface. The predefined interface, which is duplicated for each logging module, has at least one method that can be used by a server program to provide log data to logging modules. Server programs will typically be packaged and sold with a set of several different logging modules that will meet many users' needs. Users will be able to modify these logging modules or create entirely new logging modules.

A step 102 comprises installing and executing a network server program to receive and process data requests from network clients. The network server program is configurable by a system administrator to provide log data to any one or more of a plurality of logging modules in response to potentially loggable client requests. The data is provided through the predefined interface of the logging modules.

A step 104 comprises designating said one or more logging modules to the network server program so that the network server program calls the logging modules through their predefined interfaces in response to potentially loggable client requests.

Figure 4:
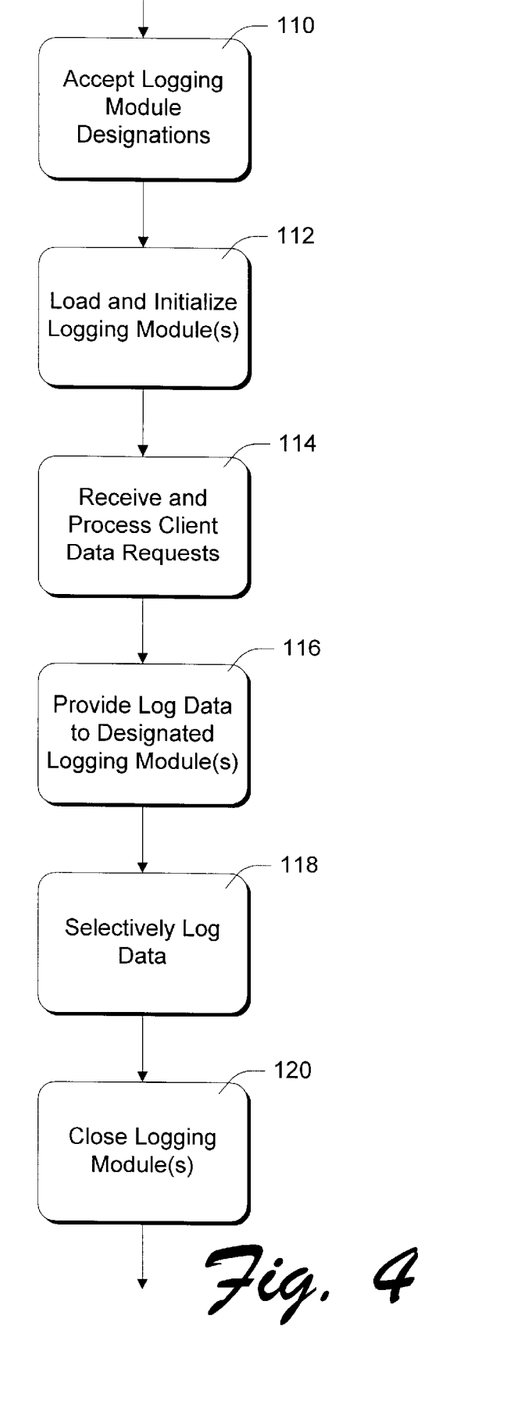

FIG. 4 shows steps performed by server computer 14, server program 40, and any designated logging modules when they have been configured as described above. A step 110 comprises accepting a designation by a system administrator of one or more logging modules to be used for logging data requests in conjunction with the network server program. A step 112 comprises loading and initializing the designated logging modules. This preferably includes calling the ILogPlugin::InitializeLog method of each designated logging module.

A step 114 comprises receiving and processing data requests from network clients. Step 116 comprises providing log data to the designated logging modules in response each data request. The log data is provided by calling a predefined interface method, which is implemented identically for each logging module, and by passing a data object to the interface method. This data object has methods that can be called to retrieve individual properties or data items relating to the data request that generated the data object.

When the predefined interface method is called, the logging module performs a logging step 118. The details of the logging step are determined entirely by the designer of the logging module, independently of the server program. Generally, each logging module logs different data selected from the log data provided by the server program. The logging modules can log any selected data, in any desired location, in response to any criteria. This step is repeated each time the predefined interface method is called, after every client request.

When the server program terminates, it performs a step 120 of closing the logging modules, by calling the ILogPlugin::InitializeLog method of each logging module.

The described architecture provides a great deal of flexibility in the way client request data is logged. Significantly, this flexibility is provided to the actual users of network server products, rather than forcing such users to accept a manufacturer's idea of which options should be available for logging.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A network server comprising:
   one or more data processors;
   a network server program that is executable by said one or more data processors to receive and process data requests from network clients; and
   the network server program being configurable by a system administrator to provide log data to any one or more of a plurality of executable logging modules designated by the system administrator, wherein the executable logging modules selectively log the log data in accordance with different logging criteria.

2. A network server as recited in claim 1, further comprising at least one logging module, wherein the logging module has one or more predefined interfaces, the interfaces having methods that are invocable by the network server program to perform respective functions comprising:
   initializing the interfaces;
   closing the interfaces;
   receiving potentially loggable log data relating to network client requests;
   setting a current logging configuration;
   returning a current logging configuration.

3. A network server as recited in claim 1, wherein the network server program provides log data through a predefined interface method that is common to any designated logging module.

4. A network server as recited in claim 1, wherein the network server program provides log data in the form of a log data object, wherein the log data object includes log data that is accessible through object interface methods.

5. A method of logging network server data, comprising the following steps:
   executing a network server program to receive and process data requests from network clients, the network server program being configurable by a system administrator to provide log data to any one or more of a plurality of logging modules designated by the system administrator in response to potentially loggable client requests, wherein the network server program provides log data to the logging modules through a predefined interface;
   creating one or more logging modules having the predefined interface, wherein each logging module logs data in accordance with independent criteria;
   designating said one or more logging modules to the network server program so that the network server program calls said one or more logging modules through their predefined interfaces in response to potentially loggable client requests.

6. A method as recited in claim 5, wherein said one or more logging modules log data in different formats.

7. A method as recited in claim 5, wherein said one or more logging modules log different data selected from the log data provided by the network server program.

8. A method as recited in claim 5, wherein the predefined interface has methods that are invocable by the network server program to perform respective functions comprising:
   initializing the interfaces;
   closing the interfaces;
   receiving potentially loggable log data relating to network client requests;
   setting a current logging configuration;
   returning a current logging configuration.

9. A method as recited in claim 5, wherein the network server program performs a step of providing log data through a predefined interface method that is common to any designated logging module.

10. A method as recited in claim 5, wherein the network server program provides log data in the form of a log data object, wherein the log data object includes log data that is accessible through object interface methods.

11. A computer-readable storage medium containing a network server program that is executable by a computer to perform the following steps:
   accepting a designation by a system administrator of one or more logging modules to be used for logging data requests in conjunction with the network server program;

receiving and processing data requests from network clients; and providing log data to the designated one or more logging modules in response to potentially loggable client requests, wherein said one or more logging modules selectively log the log data in accordance with independent criteria.

12. A computer-readable storage medium as recited in claim 11, further containing at least one logging module, wherein the logging module has one or more predefined interfaces, the interfaces having methods that are executable by the computer to perform respective functions comprising:

initializing the interfaces;

closing the interfaces;

receiving potentially loggable log data relating to network client requests;

setting a current logging configuration;

returning a current logging configuration.

13. A computer-readable storage medium as recited in claim 11, wherein the providing step is performed through a predefined interface method that is common to any logging module designated by the system administrator.

14. A computer-readable storage medium as recited in claim 11, wherein the providing step is performed by providing a log data object, wherein the log data object includes log data that is accessible through object interface methods.

15. One or more computer-readable storage media for use in conjunction with a computer, comprising:

a network server program stored on the computer-readable storage media, the network server program being executable by the computer to receive and to process data requests from network clients;

a plurality of logging modules stored on the computer-readable storage media, wherein the logging modules can be used interchangeably with the network server program, the logging modules being executable by the computer to log data in accordance with different logging criteria;

the network server program being configurable by the system administrator to provide log data to any specified one or more of the logging modules in response to potentially loggable client requests.

16. Computer-readable storage media as recited in claim 15, wherein said plurality of logging modules log data in different formats.

17. Computer-readable storage media as recited in claim 15, wherein said plurality of logging modules log different data selected from the log data provided by the network server program.

18. Computer-readable storage media as recited in claim 15, wherein the logging modules have one or more predefined interfaces, the interfaces having methods that are executable by the computer to perform respective functions comprising:

initializing the interfaces;

closing the interfaces;

receiving potentially loggable log data relating to network client requests;

setting a current logging configuration;

returning a current logging configuration.

19. Computer-readable storage media as recited in claim 15, wherein the network server program provides the log data a predefined interface method that is common to all of the logging modules.

20. Computer-readable storage media as recited in claim 15, wherein the network server program provides the log data in the form of a log data object, wherein the log data object includes log data that is accessible through object interface methods.

21. One or more computer-readable storage media for use in conjunction with a computer, comprising:

a network server program stored on the computer-readable storage media, the network server program being executable by the computer to receive and process data requests from network clients;

a plurality of logging modules stored on the computer-readable storage media, wherein the logging modules can be used interchangeably with the network server program, the logging modules being executable by the computer to log data in accordance with different logging criteria;

each logging module having a common exposed interface method that is callable by the network server program with one or more arguments including a log data object, wherein the log data object includes log data that is accessible through object interfaces;

the network server program being configurable by a system administrator to call the exposed interface method of any specified one or more of the logging modules in response to potentially loggable client requests.

22. Computer-readable storage media as recited in claim 21, wherein said plurality of logging modules log data in different formats.

23. Computer-readable storage media as recited in claim 21, wherein said plurality of logging modules log different data selected from the log data provided by the network server program.

24. Computer-readable storage media as recited in claim 21, wherein the logging modules have one or more predefined interfaces, the interfaces having methods that are executable by the computer to perform respective functions comprising:

initializing the interfaces;

closing the interfaces;

receiving potentially loggable log data relating to network client requests;

setting a current logging configuration;

returning a current logging configuration.

25. One or more computer-readable storage media for use in conjunction with a computer, comprising:

a network server program stored on the computer-readable storage media, the network server program being executable by the computer to receive and process data requests from network clients, the network server program being configurable by a system administrator to provide log data to any one or more of a plurality of logging modules designated by the system administrator in response to potentially loggable client requests, wherein the network server program provides log data to the logging modules through a predefined interface;

one or more logging modules stored on the computer-readable storage media, wherein each of the logging modules has the predefined interface and is executable by the computer to log data in accordance with different logging criteria, said one or more logging modules being registered by the system administrator with the network server program to be called through their predefined interfaces to log data.

26. Computer-readable storage media as recited in claim 25, wherein said one or more logging modules log data in different formats.

27. Computer-readable storage media as recited in claim 25, wherein said one or more logging modules log different data selected from the log data provided by the network server program.

28. Computer-readable storage media as recited in claim 25, wherein the predefined interface has interface methods that are executable by the computer to perform respective functions comprising:
   initializing the interfaces;
   closing the interfaces;
   receiving potentially loggable log data relating to network client requests;
   setting a current logging configuration;
   returning a current logging configuration.

29. Computer-readable storage media as recited in claim 25, wherein the network server program provides the log data in the form of a log data object, wherein the log data object includes log data that is accessible through object interface methods.

30. A computer-readable storage medium having a logging module with one or more interfaces, the interfaces having methods that are invocable by a network server program to perform respective functions comprising:
   initializing the interfaces;
   closing the interfaces;
   receiving potentially loggable log data relating to network client requests;
   setting a current logging configuration;
   returning a current logging configuration.

31. A computer-readable storage medium as recited in claim 30, wherein the receiving function comprises a step of receiving a log data object, wherein the log data object includes log data that is accessible through object interface methods.

32. A computer-readable storage medium as recited in claim 30, comprising a further interface method that performs a function of returning previously logged data.

33. One or more computer-readable storage media having logging modules, each logging module having one or more predefined interfaces, the interfaces of each logging module having methods that are invocable by a network server program to perform respective functions comprising:
   initializing the interfaces;
   closing the interfaces;
   receiving potentially loggable log data relating to network client requests;
   setting a current logging configuration;
   returning a current logging configuration.

34. Computer-readable storage medium as recited in claim 33, wherein the receiving function comprises a step of receiving a log data object, wherein the log data object includes log data that is accessible through object interface methods.

35. A computer-readable storage medium as recited in claim 33, comprising a further interface method that performs a function of returning previously logged data.

* * * * *

UNITED STATES PATENT AND TRADEMARK OFFICE
CERTIFICATE OF CORRECTION

PATENT NO. : 6,795,888 B1
DATED : September 21, 2004
INVENTOR(S) : Johnson R. Apacible It is certified that error appears in the above-identified patent and that said Letters Patent is hereby corrected as shown below:

<u>Title page, Item [54] and Column 1, line 1</u>
Title, insert -- SYSTEM ADMINISTRATOR -- before "INSTALLABLE" and delete "SERVERS" and insert -- SERVER --.

Signed and Sealed this

Third Day of May, 2005

JON W. DUDAS
*Director of the United States Patent and Trademark Office*